United States Patent
Yeh (10) Patent No.: US 9,689,526 B2
(45) Date of Patent: Jun. 27, 2017

(54) HOUSING WITH SUPPORT ASSEMBLY (71) Applicant: HON HAI PRECISION INDUSTRY CO., LTD., New Taipei (TW)

(72) Inventor: Guo-Liang Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/755,353

(22) Filed: Jun. 30, 2015

(65) Prior Publication Data

US 2016/0234950 A1 Aug. 11, 2016

(51) Int. Cl.
*E05D 3/10* (2006.01)
*F16M 13/00* (2006.01)
*F16M 11/10* (2006.01)
*F16M 11/38* (2006.01)

(52) U.S. Cl.
CPC ............ *F16M 13/00* (2013.01); *F16M 11/10* (2013.01); *F16M 11/38* (2013.01); *E05D 3/10* (2013.01)

(58) Field of Classification Search
USPC ....... 248/454, 455, 458, 460, 461, 463, 464, 248/220.21, 220.22, 224.7, 224.8; 446/431, 437, 456, 454, 470, 353, 356; 361/679.3, 679.56, 679.55; 16/239, 240, 16/241, 244, 245, 246, 248, 254, 264, 16/367
See application file for complete search history.

(56) References Cited

U.S. PATENT DOCUMENTS

| | | | | |
|---|---|---|---|---|
| 4,527,650 A * | 7/1985 | Bartholet | ............ | B62D 57/032 180/8.6 |
| 4,571,203 A * | 2/1986 | Murakami | ............ | A63H 33/003 446/376 |
| 4,578,046 A * | 3/1986 | Ohno | ............ | A63H 33/003 446/376 |
| 5,290,185 A * | 3/1994 | Murakami | ............ | A63H 13/06 446/330 |
| 5,423,708 A * | 6/1995 | Allen | ............ | B62D 57/032 180/8.6 |
| 5,857,533 A * | 1/1999 | Clewett | ............ | B62D 57/00 180/8.1 |
| 6,015,129 A * | 1/2000 | Harrigan | ............ | A47B 23/043 248/444 |
| 7,762,519 B2 * | 7/2010 | Kunii | ............ | F16M 11/10 248/398 |
| 7,938,708 B2 * | 5/2011 | Willet | ............ | A63H 11/205 446/330 |
| 8,534,619 B2 * | 9/2013 | Huang | ............ | F16M 11/10 248/163.1 |
| 8,793,016 B2 * | 7/2014 | Yang | ............ | B62D 57/032 180/8.1 |

(Continued)

*Primary Examiner* — Alfred Wujciak
(74) *Attorney, Agent, or Firm* — Steven Reiss (57) ABSTRACT A housing includes a housing body, and at least two support assemblies mounted on a side of the housing body and spaced from each other. Each support assembly includes a first rotating member rotatably mounted on the same side of the housing body, and a second rotating member rotatably mounted on the first rotating member. A rotating shaft of the second rotating member is not parallel to the rotating shaft of the first rotating member. An angle between the housing body and the second rotating member can be changed via rotating the second rotating member.

18 Claims, 10 Drawing Sheets (56) References Cited

U.S. PATENT DOCUMENTS

| | | | |
|---|---|---|---|
| 8,899,543 B2* | 12/2014 | Liang | A47B 23/043 |
| | | | 248/166 |
| 9,359,028 B2* | 6/2016 | Jun | B62D 57/032 |
| 2009/0209167 A1* | 8/2009 | Ejima | A63H 17/02 |
| | | | 446/93 |

* cited by examiner

HOUSING WITH SUPPORT ASSEMBLY

FIELD

The subject matter herein generally relates to a housing of an electronic device, and in particularly to a housing having an adjustable angle between the housing and a support assembly.

BACKGROUND

Housings are usually used to receive and protect electronic elements of an electronic device. A support frame is usually mounted on an outer surface of the housing to support the electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A housing can include a housing body, and at least two support assemblies mounted on a side of the housing body and spaced from each other. Each support assembly can include a first rotating member rotatably mounted on the same side of the housing body, and a second rotating member rotatably mounted on the first rotating member. A rotating shaft of the second rotating member is not parallel to the rotating shaft of the first rotating member.

A housing can include a housing body, at least two support assemblies mounted on a side of the housing body and spaced from each other, and a mounting member. Each support assembly can include a first rotating member rotatably mounted on the same side of the housing body, and a second rotating member rotatably mounted on the first rotating member. A rotating shaft of the second rotating member is not parallel to the rotating shaft of the first rotating member. The mounting member can be securely coupled to the side of the housing body, and can space a predetermined distance from the housing body. The second rotating member can be folded between the mounting member the housing body.

Figure 1:
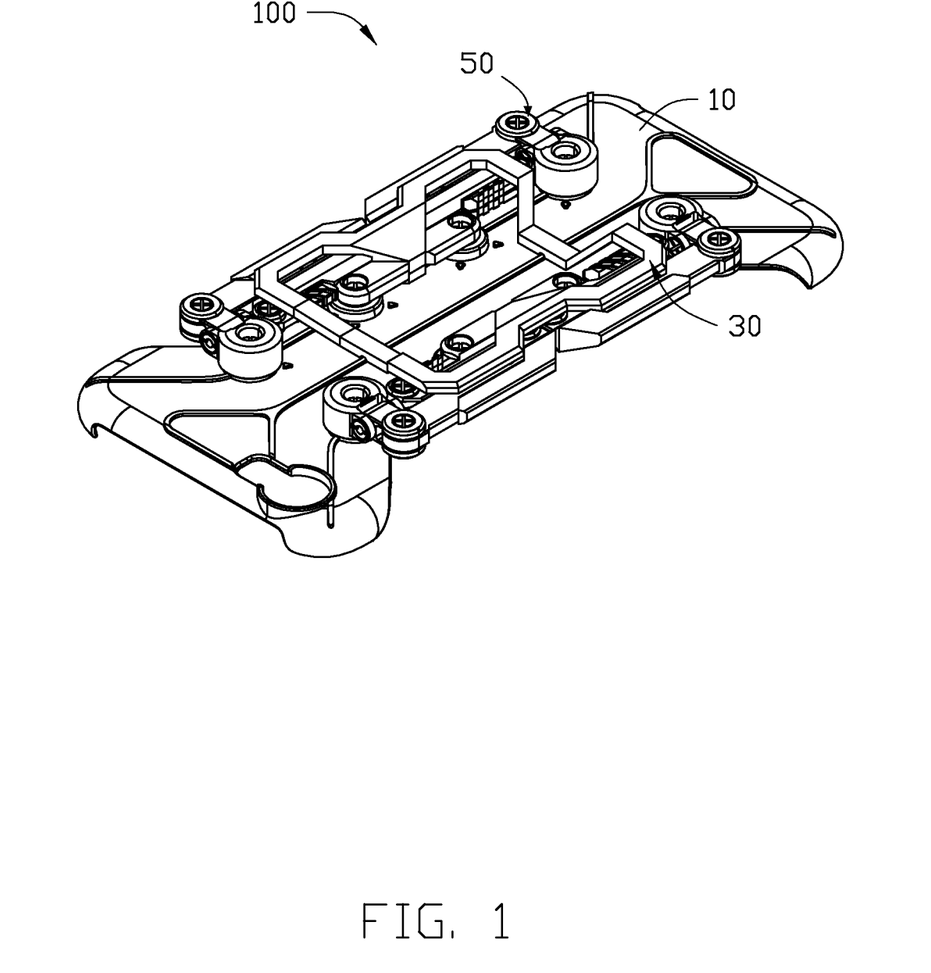
FIG. 1 is an isometric view of an embodiment of a housing, the housing includes a number of support assemblies.

FIG. 1 illustrates an embodiment of a housing 100 for receiving and protecting an electronic device (not shown). The electronic device can be a mobile phone, a computer, a television, a touch panel, a display panel, and so on. The housing 100 can include a housing body 10, a mounting assembly 30 securely mounted on the housing body 10, and four support assemblies 50 rotatably mounted on the housing body 10. The support assemblies 50 can be folded between the mounting assembly 30 and the housing body 10. In at least one embodiment, the number of the support assemblies can be changed as needed, such as, two, three, or more.

Figure 2:
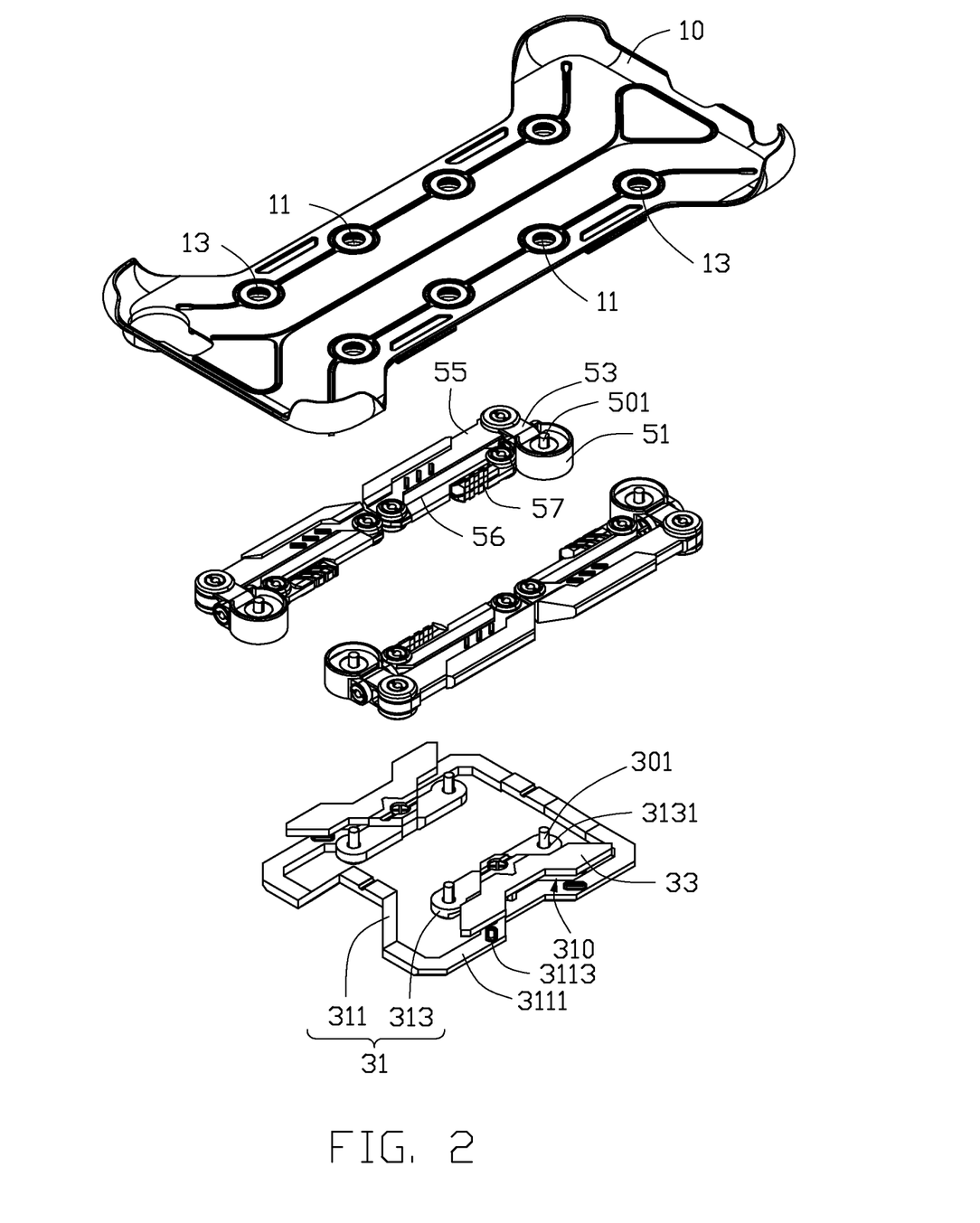
FIG. 2 is an exploded, isometric view of the housing of FIG. 1.

FIG. 2 illustrates that the housing body 10 can define four fixing holes 11 and four mounting holes 13. Each fixing hole 11 and each mounting hole 13 can be substantially cylindrical. The fixing holes 11 and mounting holes 13 can be divided into two groups. Each group of two mounting holes 13 and two fixing holes 11 can be arranged on a side of the housing body 10 along a straight line, and the two fixing holes 11 can be located between the two mounting holes 13. Central points of the four fixing holes 11 can be configured to be joined to form an imaginary square. The central points of the four mounting holes 13 can be configured to be joined to form an imaginary rectangle.

The mounting assembly can include a mounting member 31, and two fastening members 33 securely mounted on the mounting member 31. The mounting member 31 can include a mounting portion 311, and two parallel protrusion portions 313 securely mounted on the mounting portion 311. The mounting portion 311 can be substantially in a shape of an enclosure frame. The mounting portion 311 can include two opposite side arms 3111. Each protrusion portion 313 can be securely mounted on the corresponding side arm 3111. Two parallel protrusion portions 313 can be located between two side arms 3111. Each protrusion portion 313 can define two holding holes 3131 on opposite ends. Four holding holes 3131 can respectively correspond to four fixing holes 11. Four connecting pins 301 can be inserted into four fixing holes 11 and the corresponding holding hole 3131 to enable the mounting member 31 to be securely coupled to the housing body 10, now the mounting portion 311 is spaced a predetermined distance from the housing body 10. Each fastening member 33 can be substantially in a shape of a plate, and be securely mounted on a side of the corresponding protrusion portion 313. Each fastening member 33 can be spaced a predetermined distance from the corresponding side arm 3111. Each fastening member 33 and the corresponding side arm 3111 can cooperatively define a receiving space 310.

Two first latching portions 3113 can be defined on a side of each side arm 311 facing the corresponding fastening member 33. Two second latching portions 331 (shown in FIG. 9) can be defined on a side of each fastening member 33 facing the corresponding side arm 311. Two first latching portions 3113 can respectively correspond to two second latching portions 331. In at least one embodiment, the first latching portions 3113 and the second latching portions 331 can be substantially oval shaped holes.

Figure 3:
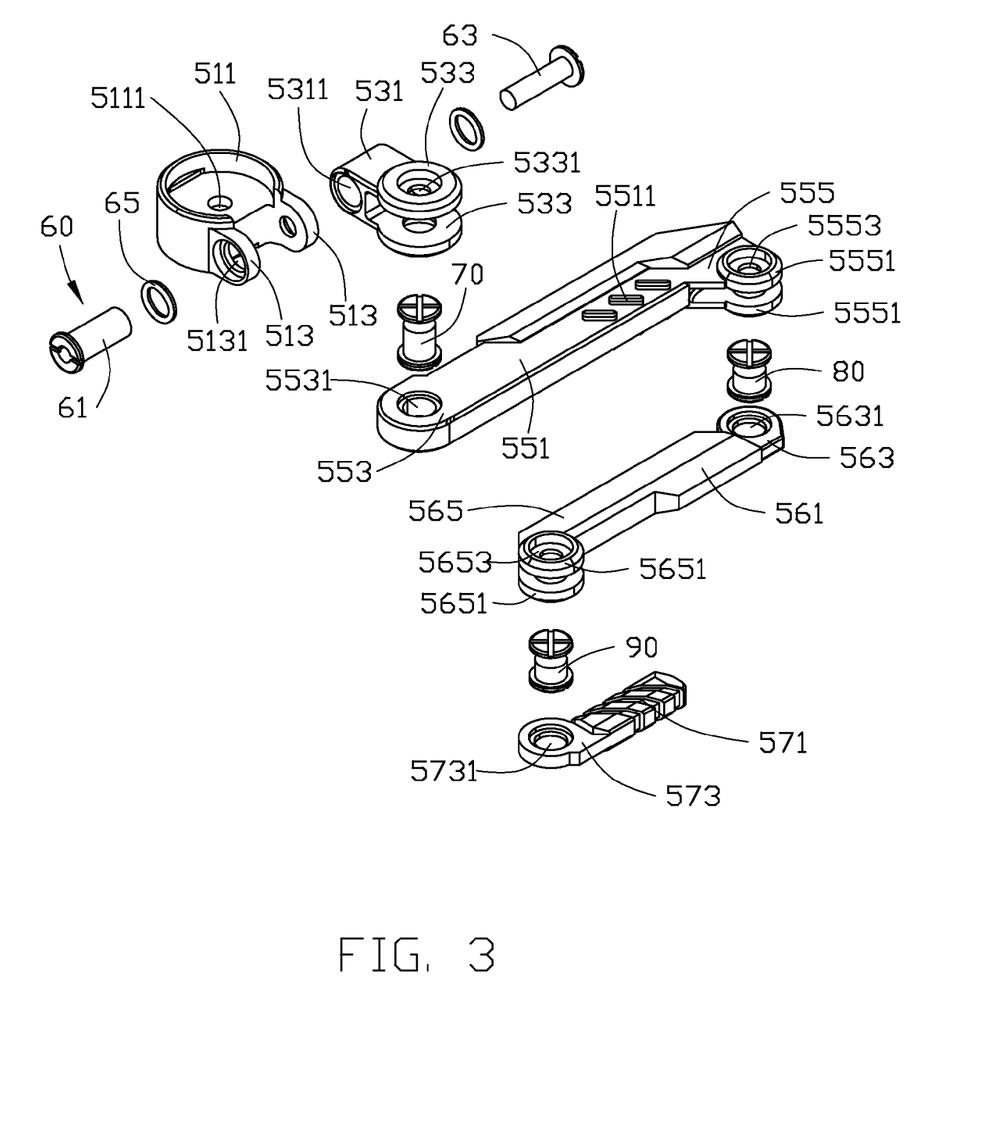
FIG. 3 is an exploded, isometric view of the support assembly of FIG. 1.
Figure 4:
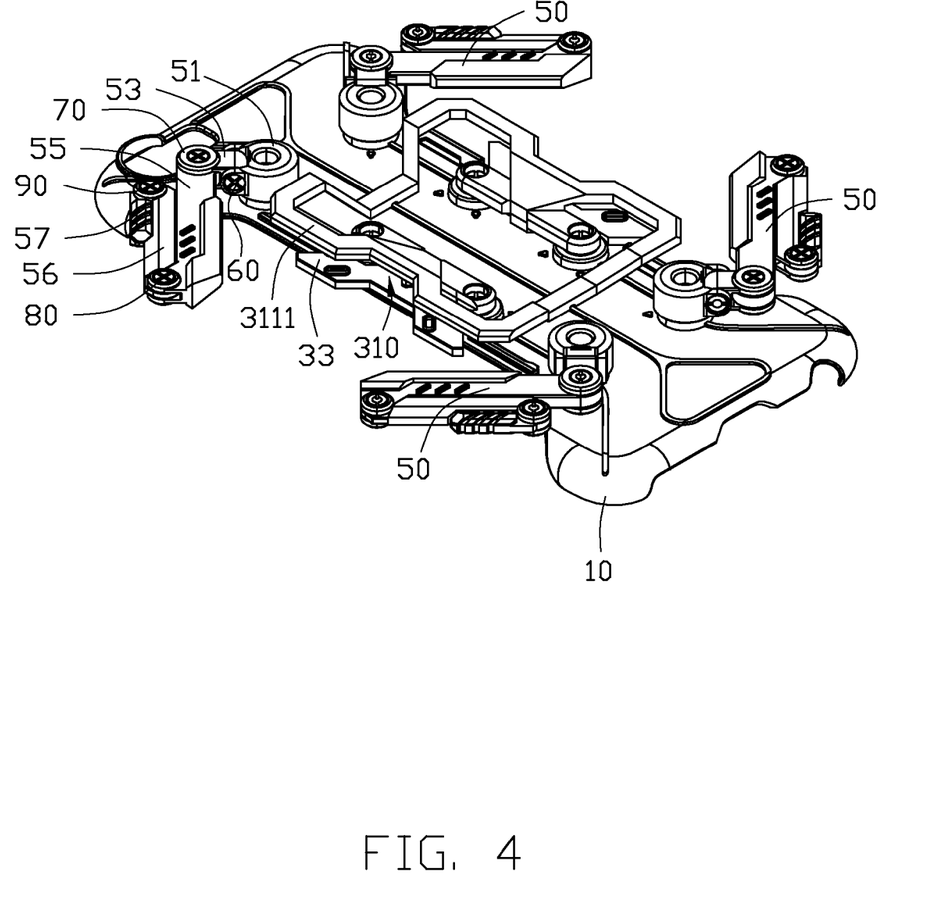
FIG. 4 is an isometric view of the housing of FIG. 1 in a first state of the support assemblies being opened.
Figure 5:
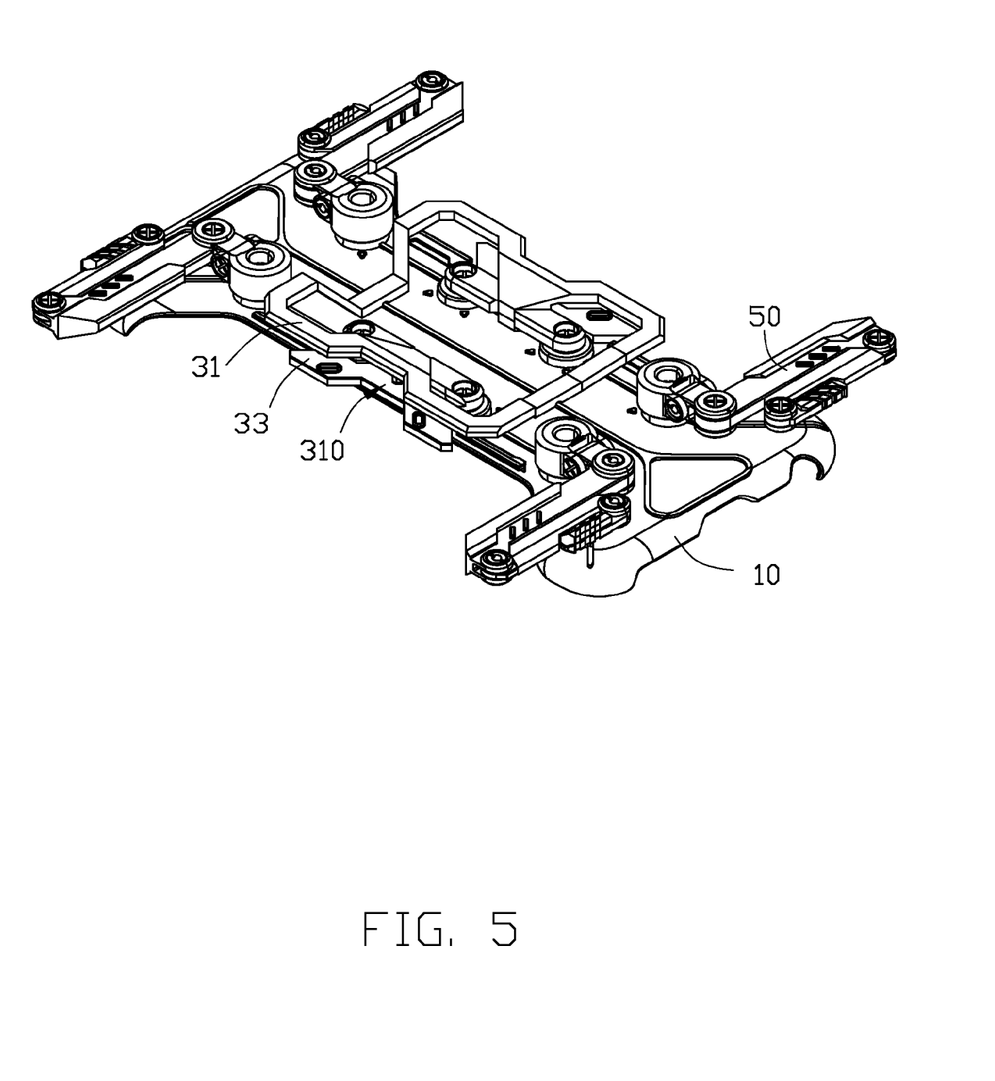
FIG. 5 is an isometric view of the housing of FIG. 1 in a second state of the support assemblies being opened.
Figure 6:
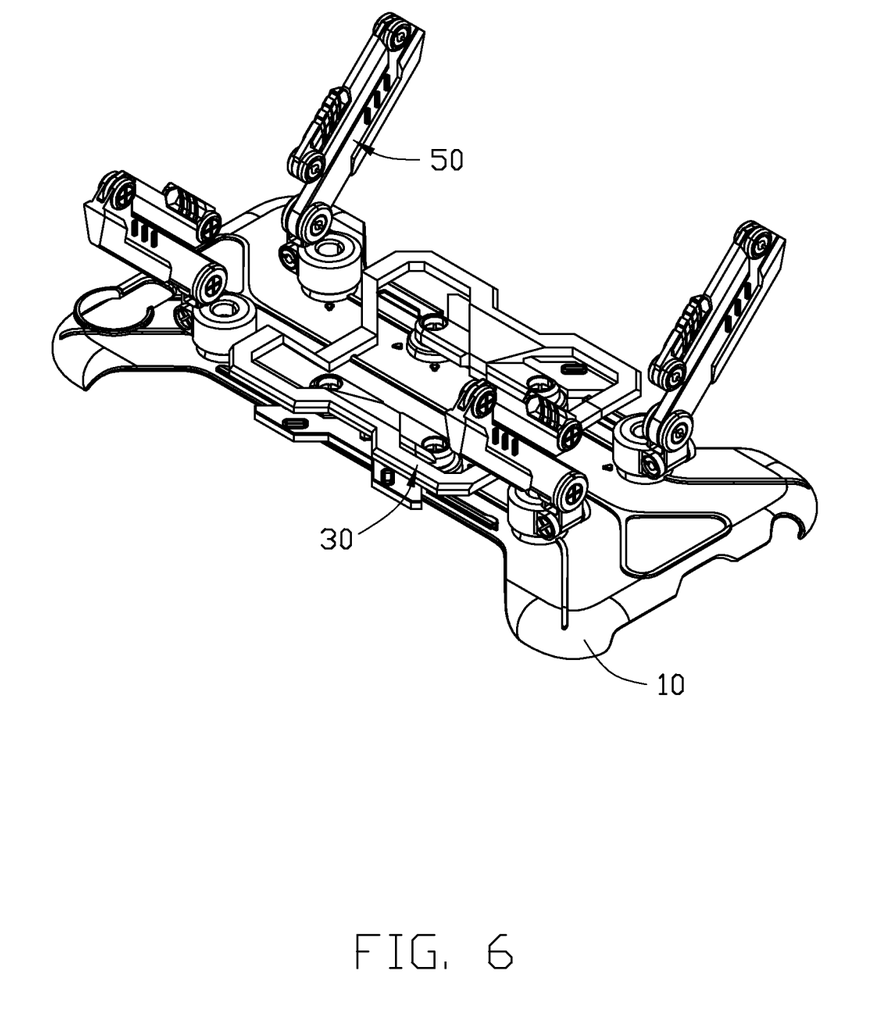
FIG. 6 is an isometric view of the housing of FIG. 1 in a second state of the support assemblies being opened.
Figure 7:
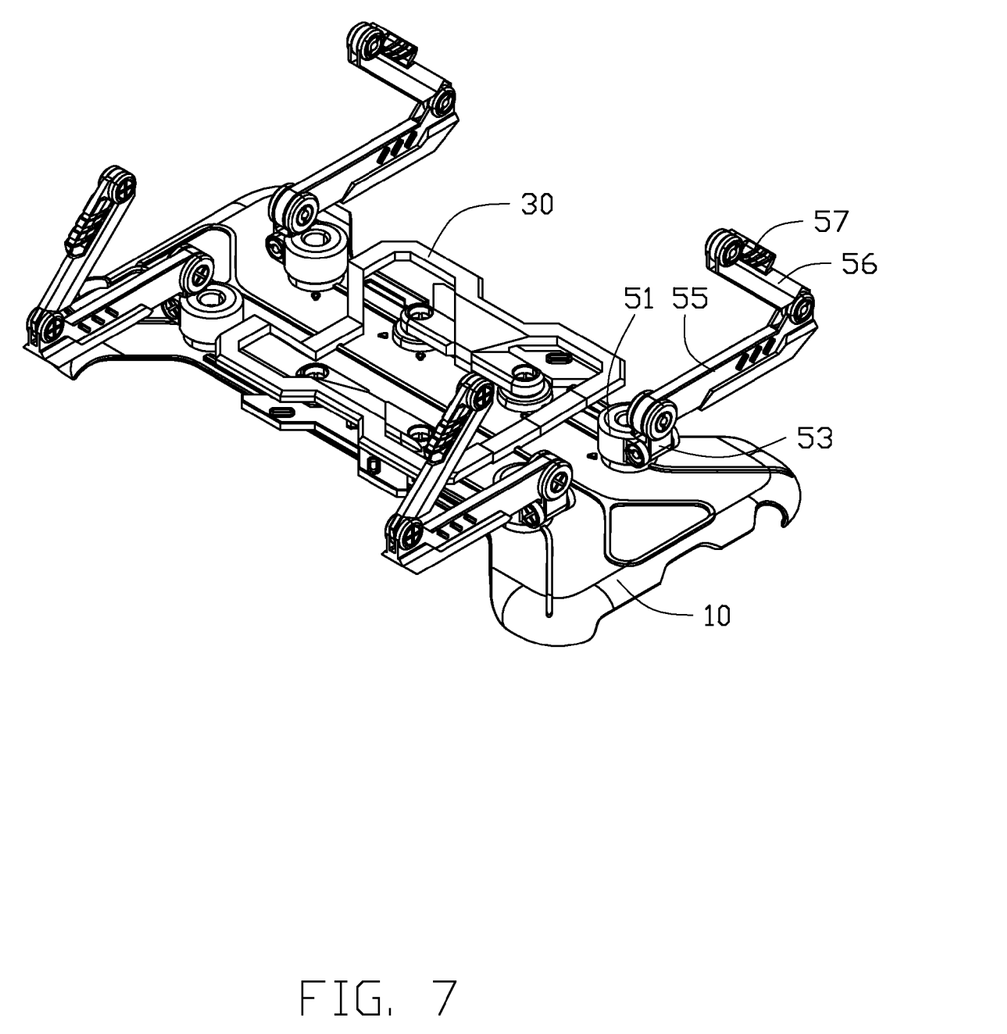
FIG. 7 is an isometric view of the housing of FIG. 1 in a third state of the support assemblies being opened.
Figure 8:
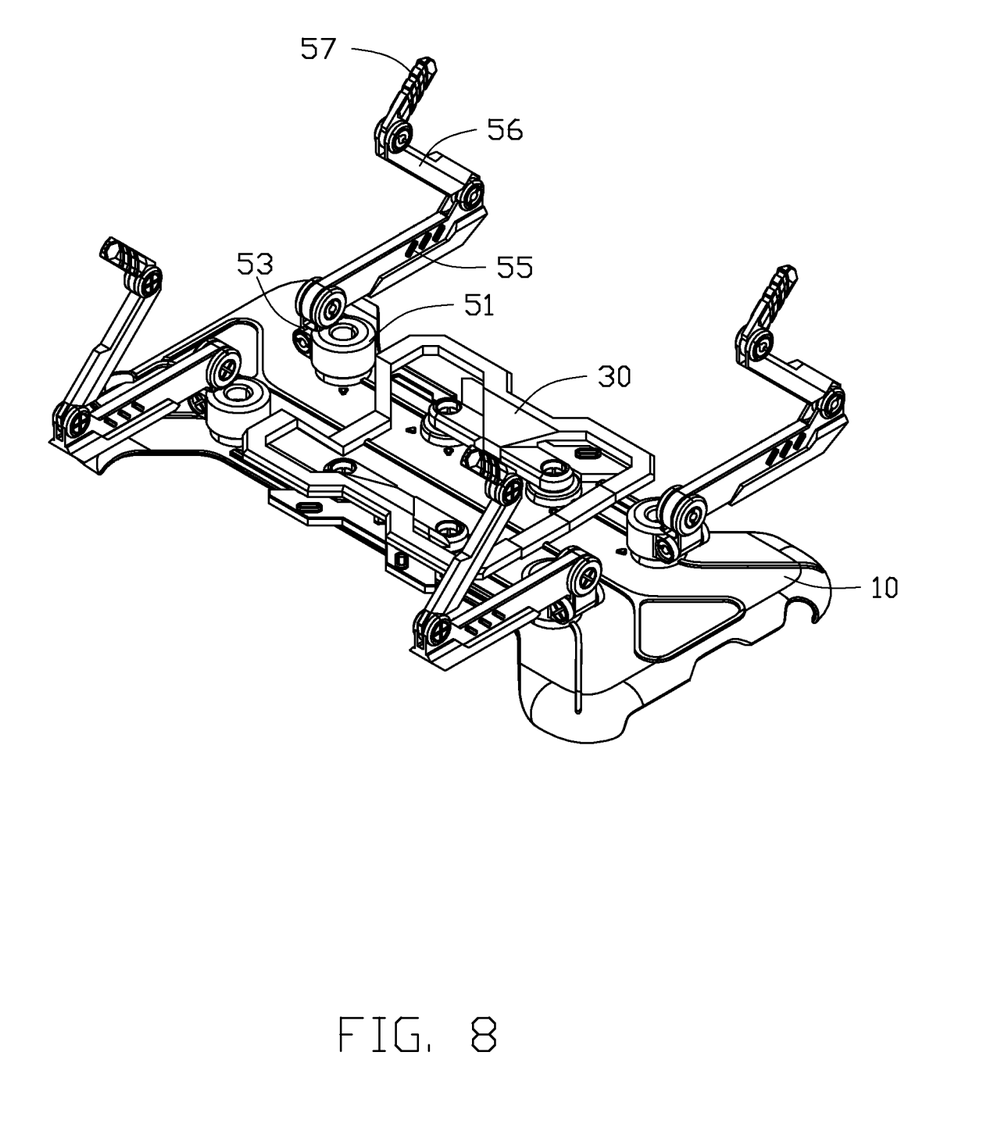
FIG. 8 is an isometric view of the housing of FIG. 1 in a fourth state of the support assemblies being opened.

FIGS. 2 and 3 illustrate that four support assemblies can be rotatably mounted on a side of the housing body 10 adjacent to the mounting assembly 30. The four support assemblies can be divided into two groups. A first group of two support assemblies can be located adjacent to one side arm 3111, and a second group of two support assemblies can be located adjacent to another side arm 3111. Each support assembly can include a first rotating member 51, a second rotating member 53, a first connecting member 55, a second connecting member 56, and a support member 57. The first rotating member 51 can be rotatably mounted on the housing body 10. The first rotating member 51 can include a first rotating portion 511, and two parallel lugs 513 protruding from the outer surface of the first rotating portion 511. The first rotating portion 511 can be substantially cylindrical, and can define a first rotating hole 5111 extending along a central axis of the first rotating portion 511. A pin bolt 501 can be inserted into the first rotating hole 5111 and the corresponding mounting hole 13 to enable the first rotating portion 511 to be rotatably coupled to the housing body 10. The first rotating portion 511 can rotate 360 degrees around the pin bolt 501. A rotation shaft of the first rotating portion 511 can be substantially perpendicular to the plane of the housing body 10. Each lug 513 can be substantially disc-shaped. The central axis of each lug 513 can be substantially perpendicular to that of the first rotating portion 511. Each lug 513 can define a stepped first connecting hole 5131 extending along its central axis.

An end of the second rotating member 53 can be rotatably mounted on the lugs 513. The second rotating member 53 can include a second rotating portion 531, and two parallel protrusions 533 protruding from the outer surface of the second rotating portion 513. The second rotating portion 531 can be substantially cylindrical, and can define a second rotating hole 5311 extending along the central axis of the second rotating portion 531. The second rotating portion 531 can be rotatably mounted on the lugs 513 via inserting a first pivot member 60 into the first connecting holes 5131 and the second rotating hole 5311. The first pivot member 60 can include a first locking portion 61, a second locking portion 63, and two washers 65. The first locking portion 61 can be substantially hollow and T-shaped. The first locking portion 61 can be movably inserted into one first connecting hole 5131, the second rotating hole 5311, and another first connecting hole 5131 in that order. The second locking portion 63 can be substantially T-shaped, and be screwed into the first locking portion 61. Each washer 65 can be sleeved on the first locking portion 61, and located adjacent to a side of the corresponding lug 513 away from the second rotating portion 531.

Each protrusion 33 can be substantially disc-shaped. The central axis of each protrusion 33 can be perpendicular to that of the second rotating portion 531. Each protrusion 33 can define a stepped second connecting hole 5331.

One end of the first connecting member 55 can be rotatably mounted on the protrusions 533. The first connecting member 55 can include a first connecting body 551, a first pivot end 553 protruding from a first end of the first connecting body 551, and a first hinge end 555 protruding from a second end of the first connecting body 551. The first pivot end 553 can define a stepped third rotating hole 5531. The first pivot end 553 can be rotatably mounted between two protrusions 533 via inserting a second pivot member 70 into the second connecting holes 5331 and the third rotating hole 5531. The structure of the second pivot member 70 can be the same as that of the first pivot member 60.

The first hinge end 555 can include two parallel first hinge portions 5551. Each first hinge portion 5551 can be substantially disc-shaped, and can define a stepped third connecting hole 5553. A number of protrusion blocks 5511 can protrude from opposite sides of each first connecting body 551 to latch with the corresponding first latching portion 3113 and the corresponding second latching portion 331.

An end of the second connecting member 56 can be rotatably mounted on two first hinge portions 5551. The structure of the second connecting member 56 can be the same as that of the first connecting member 55. The second connecting member 56 can include a second connecting body 561, a second pivot end 563 protruding from a first end of the second connecting body 561, and a second hinge portion 565 protruding from a second end of the second connecting body 561. The second pivot end 563 can define a fourth rotating hole 5631. The second pivot end 563 can be rotatably mounted between two first hinge portions 5551 via inserting a third pivot member 80 into the fourth rotating hole 5631 and the third connecting holes 5553. The structure of the third pivot member 80 can be the same as that of the first pivot member 60.

The second hinge end 565 can include two parallel second hinge portions 5651. Each second hinge portion 5651 can be substantially disc-shaped. Each second hinge portion 5651 can define a fourth connecting hole 5653.

An end of the support member 57 can be rotatably mounted on two second hinge portions 5651. The support member 57 can include a support portion 571, and a connecting end 573 protruding from an end of the support portion 571. The connecting end 573 can define a stepped fifth rotating hole 5731. The connecting end 573 can be rotatably mounted between two second hinge portions 5651 via inserting a fourth pivot member 90 into the fifth rotating hole 5731 and the fourth connecting holes 5653. The structure of the fourth pivot member 90 can be the same as that of the third pivot member 80. The second pivot member 70, the pivot member 80, the pivot member 90, and the pin bolt 501 can be parallel to each other. Each of the second pivot member 70, the pivot member 80, the pivot member 90, and the pin bolt 501 can be perpendicular to the first pivot member 60.

In assembly, the mounting assembly 30 can be securely coupled to the housing body 10. The support assemblies 50 can be rotatably mounted on the housing body 10, respectively. The first connecting member 55, the second connecting member 56, and the support member 57 of each support member 50 can be folded into the corresponding receiving space 310, and located between the mounting member 31 and the housing body 10. After being folded, the second connecting member 56, and the support member 57 of each support member 50 can be substantially parallel to each other. Each protrusion block 5511 can latch with the corresponding first latching portion 3113 and the corresponding second latching portion 331.

FIGS. 4 to 8 illustrate a process for opening the support assemblies 50 to a first state. The first rotating portion 51 can rotate to let the corresponding support arm 50 rotate around the pin bolt, such the support arm 50 can move out of the receiving space 310. The second rotating member 53 can rotate to let the corresponding support arm 50 rotate around the first pivot member, such an angle between the support arm 50 and the housing body 10 can be changed. The first connecting member 55 can be deployed by rotating around the second pivot member, such the angle between the support arm 50 and the housing body 10 can be further changed. The second connecting member 56 can be deployed by rotating around the third pivot member, thus the angle between the support arm 50 and the housing body 10 can be further changed. The support member 57 can be deployed by rotating around the fourth pivot member to support the housing 100.

Figure 9:
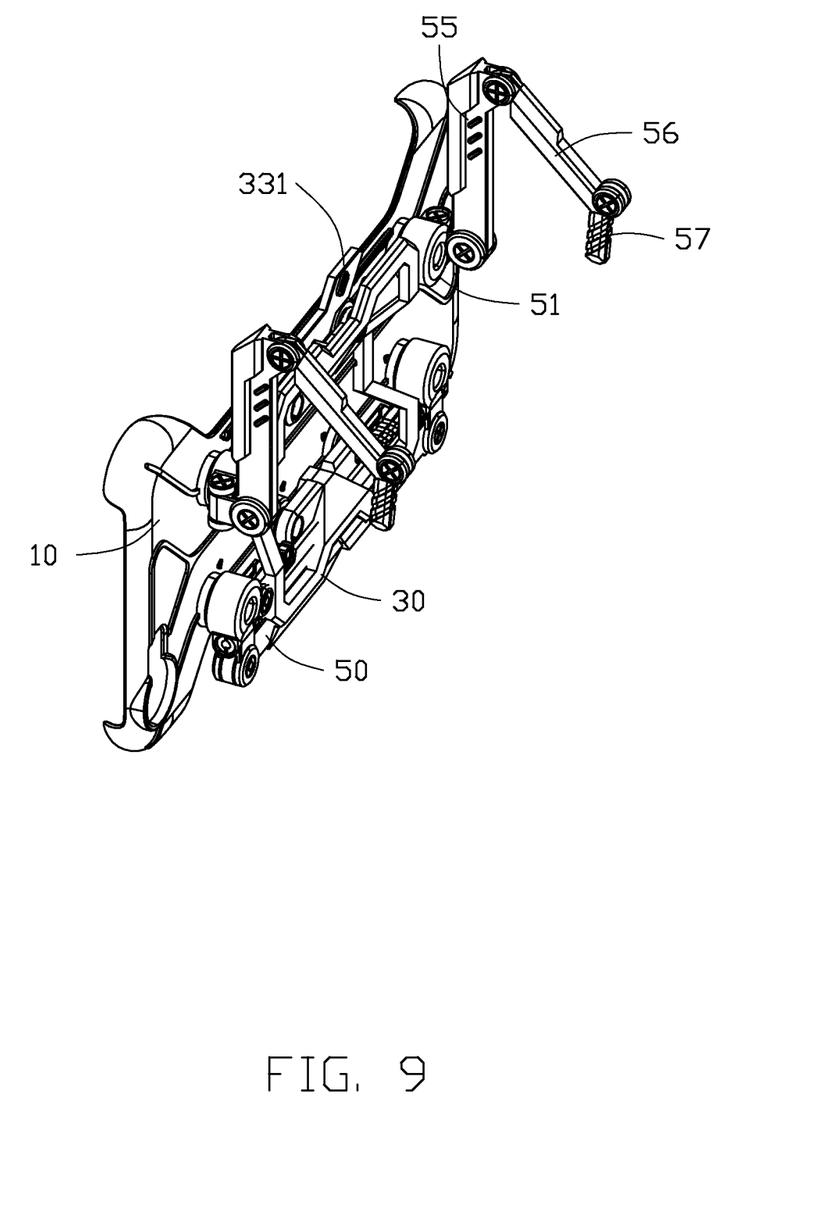
FIG. 9 is similar to FIG. 1, but showing the housing in a first state of use.
Figure 10:
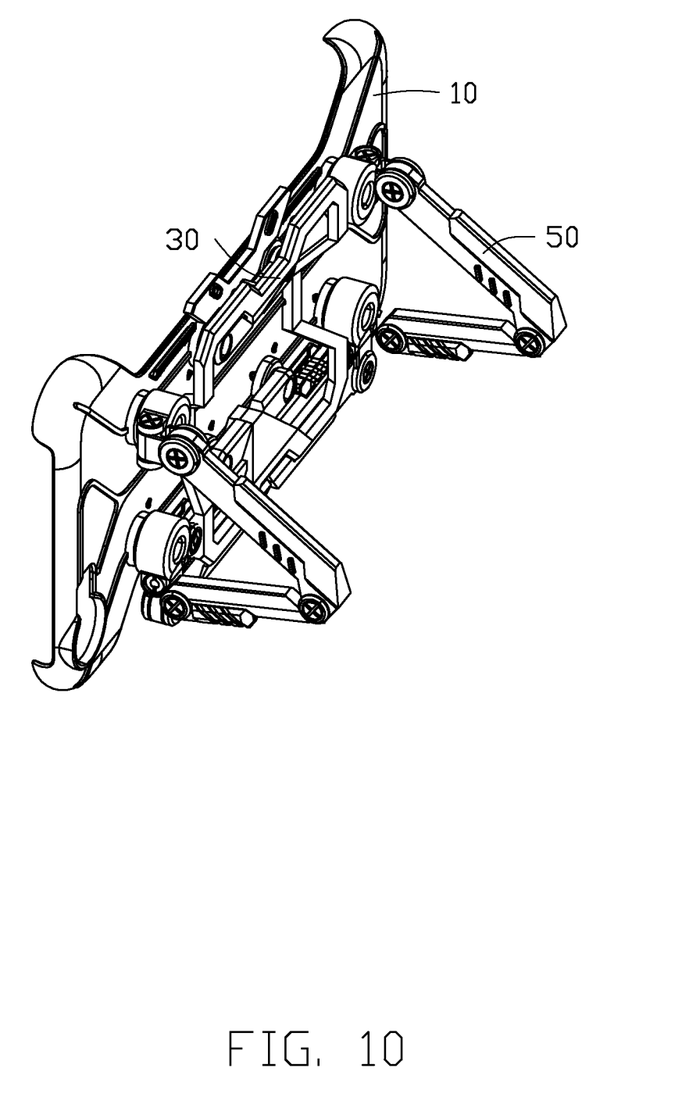
FIG. 10 is similar to FIG. 1, but showing the housing in a second state of use.

FIG. 9 illustrates a second state of the opened support assemblies 50. FIG. 10 illustrates a third state of the opened support assemblies 50.

In at least one embodiment, the first connecting member 55, the second connecting member 56, and the support member 57 can be omitted, by this time the second rotating member 53 can be configured to support the housing 100. In at least one embodiment, any one of the second rotating member 53, the first connecting member 55, and the second connecting member 56 can be used as a support member. In at least one embodiment, the washers can be omitted. In at least one embodiment, the number of the washers can be changed as needed. In at least one embodiment, the rotation shaft of the first rotating member 51 is not perpendicular to the housing body 10. In at least one embodiment, the rotation shaft of the second rotating member 53 is not perpendicular to the rotation shaft of the first rotating member 51, so long as the rotation shaft of the second rotating member 53 is not parallel to that of the first rotating member 51.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A housing for housing a portable electronic device:
   a housing body for housing the portable electronic device;
   a first pivot member, and
   at least two support assemblies mounted on a side of the housing body and spaced from each other, each support assembly comprising:
      a first rotating member rotatably mounted on the same side of the housing body, and comprising a first rotating portion rotatably mounted on the housing body, and two parallel lugs protruding from an outer surface of the first rotating portion, a central axis of the first rotating portion being perpendicular to a central axis of the lugs, and
      a second rotating member being rotatably mounted on the lugs of first rotating member by the first pivot member,
      wherein a rotating shaft of the second rotating member is not parallel to a rotating shaft of the first rotating member;
      wherein the first pivot member comprises a first locking portion configured to movably pass through the lugs and an end of the second rotating member, and a second locking portion screwed into the first locking portion.

2. The housing of claim 1, wherein the rotating shaft of the first rotating member is perpendicular to a plane of the housing body, and the rotating shaft of the second rotating member is parallel to the plane of the housing body.

3. The housing of claim 1, wherein the first pivot member further comprises two washers, the end of the second rotating member touching the first locking portion is located between the lugs, each washer is sleeved on the first locking portion and located adjacent to a side of the corresponding lug away from the rotating member.

4. The housing of claim 1, wherein each support assembly further comprises a first connecting member, the first connecting member has a first pivot end rotatably mounted on the second rotating member.

5. The housing of claim 4, wherein first connecting member further comprises a first hinge end opposite to the first pivot end, each support assembly further comprises a second connecting member having a second pivot end, the second pivot end is rotatably mounted on the first hinge end.

6. The housing of claim 5, wherein the second connecting member further has a second hinge end opposite to the second pivot end, each support assembly further comprises a support member rotatably mounted on the second hinge end.

7. The housing of claim 6, wherein the rotating shafts of the first connecting member, the second connecting member, and the support member are parallel to the rotating shaft of the first rotating member.

8. The housing of claim 6, wherein the housing further comprises a mounting member securely coupled to the same side of the housing body and spaced a predetermined distance from the housing body, the first connecting member, the second connecting member, and the support member are folded between the mounting member and the housing body.

9. The housing of claim 8, wherein the housing further comprises a fastening member securely coupled to a side of the mounting member adjacent to the housing body, the mounting member comprises a side arm, the side arm is spaced a predetermined distance away from the fastening member, the side arm and the fastening member together define a receiving space, the first connecting member, the second connecting member, and the support member are folded into the receiving space.

10. The housing of claim 9, wherein the first connecting member has a first connecting body interconnecting the first pivot end and the first hinge end, a first protrusion block protrudes from a first side of the first connecting body facing the side arm, the side arm has a first latching portion matching with the first protrusion block, the first protrusion block latches with the first latching portion.

11. The housing of claim 10, wherein a second protrusion block protrudes from a second side of the first connecting body facing the fastening member, the fastening member has a second latching portion matching with the second protrusion block, the second protrusion block latches with the second latching portion.

12. A housing for housing a portable electronic device:
a housing body for housing the portable electronic device;
at least two support assemblies mounted on a side of the housing body and spaced from each other, each support assembly comprising:
a first rotating member rotatably mounted on the same side of the housing body, and
a second rotating member rotatably mounted on the first rotating member,
wherein a rotating shaft of the second rotating member is not parallel to a rotating shaft of the first rotating member; and
a mounting member securely coupled to the side of the housing body and spaced a predetermined distance away from the housing body,
wherein the second rotating member is folded between the mounting member and the housing body.

13. The housing of claim 12, wherein the rotating shaft of the first rotating member is perpendicular to a plane of the housing body, and the rotating shaft of the second rotating member is parallel to the plane of the housing body.

14. The housing of claim 13, wherein the first rotating member comprises a first rotating portion rotatably mounted on the housing body, and two parallel lugs protruding from an outer surface of the first rotating portion, a central axis of the first rotating portion is perpendicular to a central axis of the lugs, the second rotating member is rotatably mounted on the lugs via a first pivot member.

15. The housing of claim 14, wherein the first pivot member comprises a first locking portion configured to movably pass through the lugs and an end of the second rotating member, and a second locking portion screwed into the first locking portion.

16. The housing of claim 15, wherein the first pivot member further comprises two washers, the end of the second rotating member touching the first locking portion is located between the lugs, each washer is sleeved on the first locking portion and located adjacent to a side of the corresponding lug away from the rotating member.

17. The housing of claim 12, wherein each support assembly further comprises a first connecting member, the first connecting member has a first pivot end rotatably mounted on the second rotating member.

18. The housing of claim 17, wherein first connecting member further comprises a first hinge end opposite to the first pivot end, each support assembly further comprises a second connecting member having a second pivot end, the second pivot end is rotatably mounted on the first hinge end.

* * * * *